No. 657,657. Patented Sept. 11, 1900.
G. HERBERT, Jr.
APPARATUS FOR FEEDING OR DELIVERING BISCUITS FOR PACKING.
(Application filed June 26, 1900.)
(No Model.) 3 Sheets—Sheet 1.
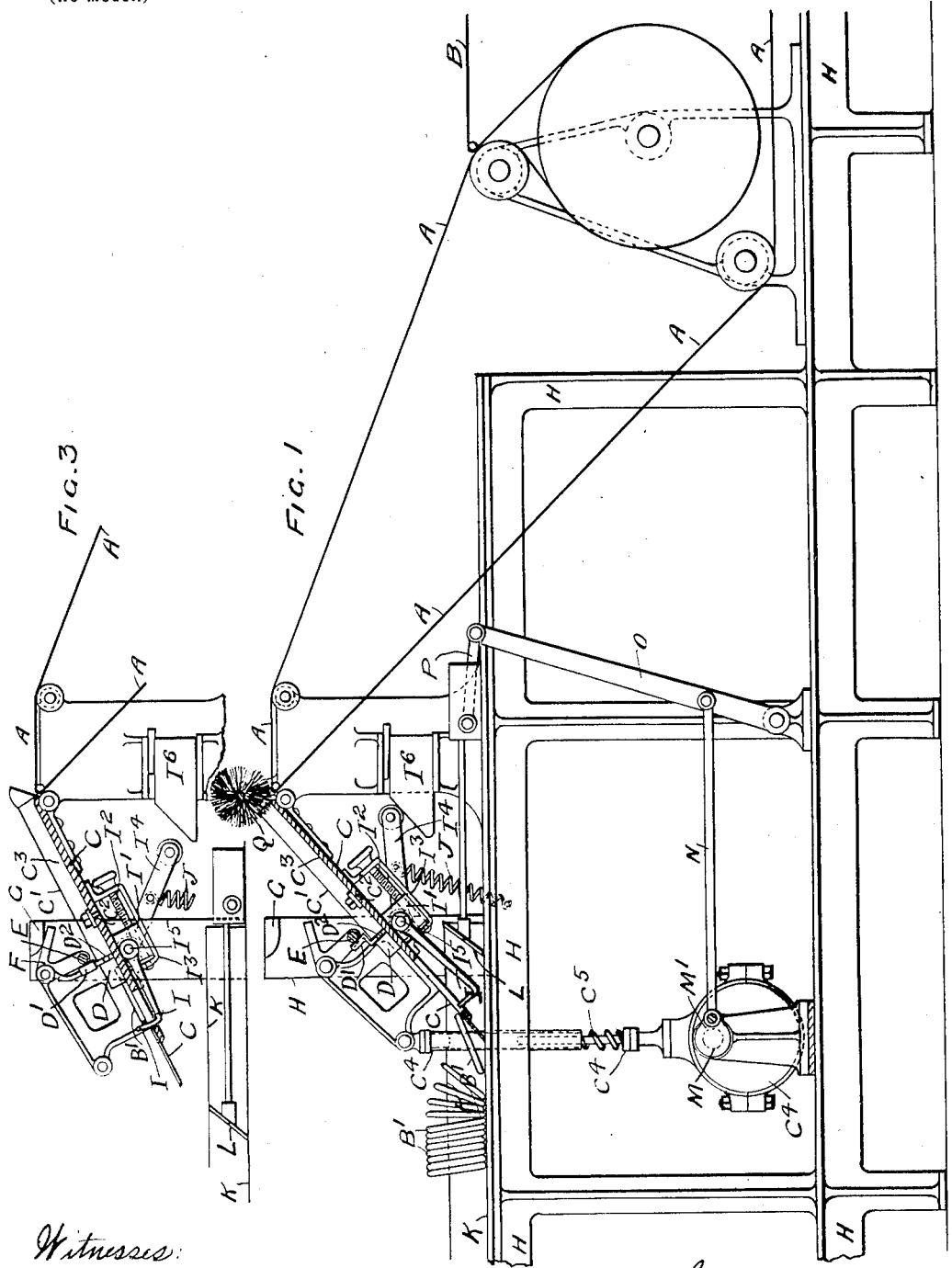
Witnesses:
E. Holloway
W. C. Pinckney
Inventor:
George Herbert, Junior
By J.E.M.Bowen
Attorney

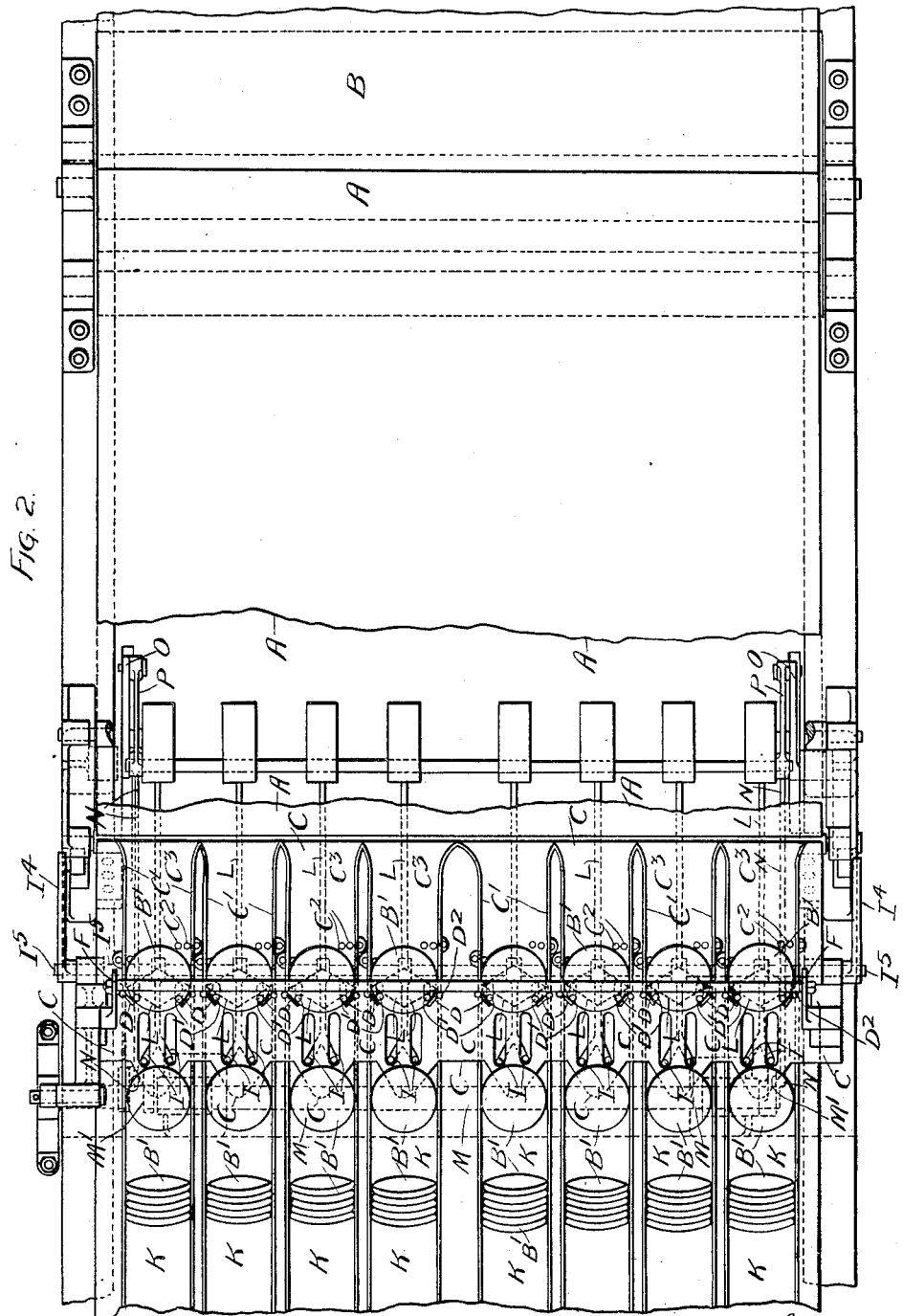

No. 657,657. Patented Sept. 11, 1900.
G. HERBERT, Jr.
APPARATUS FOR FEEDING OR DELIVERING BISCUITS FOR PACKING.
(Application filed June 26, 1900.)
(No Model.) 3 Sheets—Sheet 3.

Witnesses:
C. Holloway
W. C. Pinckney

Inventor:
George Herbert, Junior,
By J. E. M. Bowen
Attorney.

UNITED STATES PATENT OFFICE.

GEORGE HERBERT, JR., OF GLASGOW, SCOTLAND.

APPARATUS FOR FEEDING OR DELIVERING BISCUITS FOR PACKING.

SPECIFICATION forming part of Letters Patent No. 657,657, dated September 11, 1900.

Application filed June 26, 1900. Serial No. 21,602. (No model.)

*To all whom it may concern:*

Be it known that I, GEORGE HERBERT, Jr., a citizen of the United Kingdom of Great Britain and Ireland, residing at Kingston Biscuit Factory, Kinning street, Kingston, Glasgow, Scotland, have invented certain new and useful Improvements in Apparatus for Feeding or Delivering Biscuits for Packing, (for which application for patent has been made in Great Britain, No. 24,844, dated December 14, 1899,) of which the following is a specification.

In packing biscuits as ordinarily practiced the biscuits as they are removed from the baking-ovens are deposited onto a table or in trays or boxes in loose heaps, from which they are removed and sorted or arranged by hand in rows in which the biscuits all face one way.

My invention has for its object to economize time and labor in packing biscuits by providing mechanically-operated apparatus, which feeds forward the biscuits from a table on which they are laid flat and delivers them into a trough-like receptacle resting on edge, but all facing one way, so that any number may be lifted out ready for packing.

The invention is illustrated by the accompanying drawings.

Figure 4:
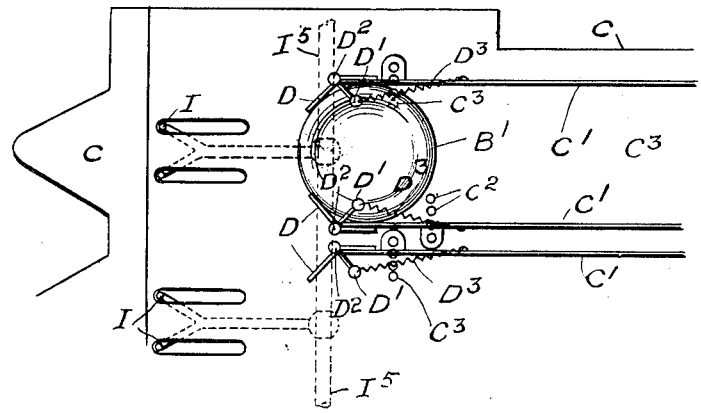
Figure 5:
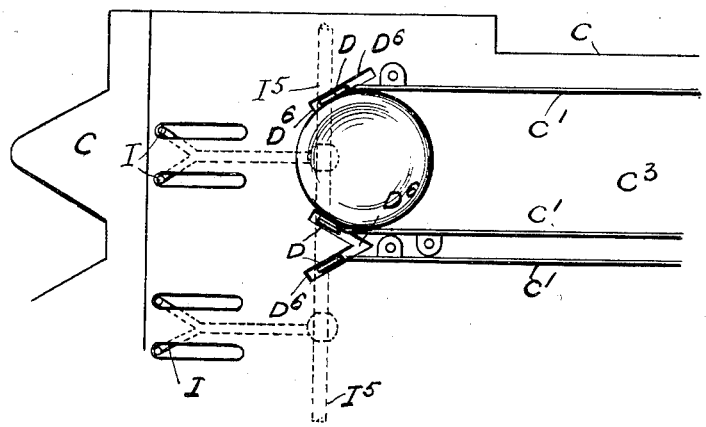

Figure 1 is a vertical longitudinal section, and Fig. 2 a plan, of the improved apparatus. Fig. 3 is a detail view of the device for preventing the passage of more than one biscuit or series of superposed biscuits at a time and showing this device in a position different from that in which it is shown at Fig. 1. Fig. 4 is a part plan of this device to a larger scale, and Fig. 5 is a plan of a modified form of the same.

Under the invention an endless traveling band A is employed to convey the biscuits B' from the table B, which may also consist of a traveling band on which they are laid, to a series of shallow inclined chutes $C^3$, formed side by side, preferably on an oscillating table C, actuated by an eccentric $C^4$ or otherwise, down which chute the biscuits slide one after another on their bottom faces, the said chute having side rails or edges C', which are preferably adjustable toward or from each other by securing them in either of the holes $C^2$ in said table, so that the width of chute may correspond approximately to the diameter of biscuit fed over it. In the side rails or sides C' of each chute movable catches D are fitted and are preferably pivoted, as shown at Figs. 1, 2, and 3, on or in the side rails C', one catch being fitted in each rail and the pair moved in unison, so as to bring them across or partly across the chute to intercept the biscuits and to withdraw them flush with the side rails to permit of the passage of one biscuit at a time or of the passage of a number superposed on the bottom biscuit. The opening of the catches D for the above purpose is effected by the action upon cranked arms D' (shown particularly at Fig. 4) on the pivots $D^2$ of the catches D of a bar E, extending between two bell-crank levers F, pivoted on the oscillating table C and brought against stops G, secured on the frame H of the machine by the rising of the oscillating table. The catches D are closed to retain the other biscuits in the chute by the action upon them of tension-springs $D^3$, secured to the arms D' and the sides of the rails C'. At a lower point a like pair of catches are fitted in the chute or an upwardly-projecting pin or pins I, adjustable in respect to the upper catches, the adjustment of the latter being effected, as shown, by moving the blocks I', in which the spindle $I^5$, carrying the pins I, is centered, toward or from the catches D by means of a screw-threaded spindle $I^2$ or otherwise passing through said block and carried in a frame $I^3$, attached to the oscillating table C. The catches when they are employed instead of pins are similar in form and action to the upper catches, but act alternately with them, and the pin or pins when such is or are employed being adapted to move upward through the table C under the action of springs J into the path of the biscuit just issued from the catches D, as shown at Fig. 3, and downward through the bottom of the chute or table out of the path of the biscuits by the action upon a lever-arm $I^4$, keyed on the spindle $I^5$, of an adjustable inclined block $I^6$, as shown at Fig. 1, the pins being so moved to allow the lowest biscuit to slide onto stationary trough-like receptacles K. Instead of a curvilinear motion being imparted to the pins these may have a perpendicular movement in respect to the table C, the pins in each case being projected upward and downward through their slots for the purpose already described. As the upper catches D and lower catches or pins I are moved alternately into the path of the descending biscuits the lowest biscuit is retained by the lower catches or pins, while those above rest each one against the edge of that below it; but when the lower catch or pin is withdrawn and the upper catches projected inward from the side rails the lowest biscuit or superposed biscuits is or are free to drop, as shown at Figs. 1 and 2, and those above are retained. In this way one biscuit at a time or series of superposed biscuits is allowed to drop from each chute and they fall on edge into the shallow trough K, along which they are pushed while still on edge by plungers L, fitted to reciprocate in the rear of the troughs K, these plungers being reciprocated from cranks M' on the power-shaft M through connecting-rods N, levers O, and short rods P, or otherwise. The biscuits as they fall are thus pushed along the troughs on edge, and they are delivered or lifted out at the further end properly sorted for packing.

In order to allow of a pause at the upper end of the stroke to permit of the proper feeding of the biscuit from the traveling band A onto the oscillating table C and of the proper discharge of the biscuit from the catches D, the eccentric $C^4$ when such is used is made in two parts, having a spring $C^5$ interposed between them, so that when the table C is prevented by the stops G from further upward movement the continued upward movement of the eccentric may be taken up by compression of the spring. Instead of employing an eccentric for raising and lowering the table C a cam may be employed.

A brush Q may be employed to assist the transference of the biscuits from the traveling band A to the table C.

The catches D instead of being fitted to turn upon pivots for the purpose of retaining and freeing the biscuits may be arranged, as shown at Fig. 5, to slide in slots $D^6$ toward and from the center of the chutes C' for the same purpose, or any other means for obtaining the same result may be employed, so long as the edge of the biscuit rests merely against the catches and no pressure is brought to bear upon the top of the biscuit, which in all cases would be detrimental to the delivery of the same in a whole condition.

Instead of the table being adapted to oscillate a stationary inclined table may be employed, the catches and pins being formed and arranged as already described, but mechanism, such as cams or wipers, being arranged to act on the bell-crank levers F and on the lever-arm $I^4$ at the proper times.

Having now described the invention, what I claim, and desire to secure by Letters Patent, is—

1. Apparatus for feeding or delivering biscuits for packing, consisting of the combination with a traveling band onto which the biscuits are laid, of an inclined table, a series of chutes on said table formed by adjustable side rails down which the biscuits travel, movable catches in said rails adapted to alternately retain and release the biscuits in the chute, movable pins adapted to catch the released biscuits and afterward to allow them to pass, stationary troughs for receiving the delivered biscuits and pistons normally situated behind the table and moving forward to push the delivered biscuits in an approximately-upright position along said trough, substantially as described.

2. In apparatus for feeding or delivering biscuits for packing, the combination with an inclined table having a series of chutes formed by side rails on it, of movable catches in the side rails, bell-crank levers carrying between them a bar for opening these catches, cams or stops for operating the bell-crank levers, pins for retaining the biscuits released from the chutes by the catches, said pins being actuated by inclined blocks or cams, and a movable piston for raising the biscuits into an approximately-upright position, said piston being operated by a crank through connecting-rods and levers, substantially as described.

In witness whereof I have hereunto set my hand in presence of two witnesses.

GEORGE HERBERT, JUNIOR.

Witnesses:
WALLACE FAIRWEATHER,
JNO. ARMSTRONG, Jr.